United States Patent
Ivan et al.

(10) Patent No.: US 8,839,859 B2
(45) Date of Patent: Sep. 23, 2014

(54) WATER ABSORBING POLYMERS FOR TREATMENT OF BRINES AND WATER-BASED DRILLING FLUIDS

(75) Inventors: Catalin Ivan, Houston, TX (US); Karen McCosh, Aberdeen (GB)

(73) Assignee: M-I L.L.C., Houston, TX (US)

( * ) Notice: Subject to any disclaimer, the term of this patent is extended or adjusted under 35 U.S.C. 154(b) by 1142 days.

(21) Appl. No.: 11/816,689

(22) PCT Filed: Jan. 9, 2007

(86) PCT No.: PCT/US2007/060276
§ 371 (c)(1),
(2), (4) Date: Apr. 16, 2010

(87) PCT Pub. No.: WO2007/082207
PCT Pub. Date: Jul. 19, 2007

(65) Prior Publication Data
US 2010/0204066 A1  Aug. 12, 2010

Related U.S. Application Data

(60) Provisional application No. 60/757,620, filed on Jan. 10, 2006.

(51) Int. Cl.
*B01D 17/02* (2006.01)
*E21B 21/06* (2006.01)

(52) U.S. Cl.
CPC .......... *E21B 21/068* (2013.01); *B01D 17/0202* (2013.01)
USPC ............ 166/267; 166/292; 166/294; 166/295

(58) Field of Classification Search
USPC ............. 166/267; 175/65; 210/650, 635, 713, 210/799, 803
See application file for complete search history.

(56) References Cited

U.S. PATENT DOCUMENTS

| | | | |
|---|---|---|---|
| 4,618,631 A | | 10/1986 | Takeda et al. |
| 4,698,404 A | | 10/1987 | Cramm et al. |
| 4,755,560 A | | 7/1988 | Ito et al. |
| 4,913,585 A | * | 4/1990 | Thompson et al. ...... 405/129.25 |
| 5,034,139 A | * | 7/1991 | Reid et al. .................. 507/119 |
| 5,258,123 A | * | 11/1993 | Huang et al. .................. 210/663 |
| 5,384,343 A | | 1/1995 | Farrar et al. |
| 5,804,535 A | | 9/1998 | Dobson et al. |
| 6,015,535 A | | 1/2000 | Brown et al. |
| 6,036,870 A | | 3/2000 | Briant et al. |
| 6,100,222 A | | 8/2000 | Vollmer et al. |
| 6,132,619 A | * | 10/2000 | Lin et al. ..................... 210/662 |
| 6,177,014 B1 | | 1/2001 | Potter et al. |
| 6,222,091 B1 | | 4/2001 | Beihoffer et al. |
| 6,376,072 B1 | | 4/2002 | Evans et al. |
| 6,399,730 B1 | | 6/2002 | Freeman et al. |
| 6,423,802 B1 | | 7/2002 | Miller et al. |
| 6,436,879 B1 | | 8/2002 | Brown et al. |
| 6,581,701 B2 | | 6/2003 | Heying |
| 6,596,921 B2 | | 7/2003 | Beihoffer et al. |
| 6,656,989 B1 | | 12/2003 | Benton et al. |
| 6,750,262 B1 | | 6/2004 | Hahnle et al. |
| 6,790,811 B2 | * | 9/2004 | Patel ............................ 507/129 |
| 6,797,656 B2 | | 9/2004 | Tsuchiya et al. |
| 6,818,595 B2 | * | 11/2004 | Benton et al. ................. 507/103 |
| 7,077,219 B1 | * | 7/2006 | Chatterji et al. ................ 175/66 |
| 2003/0006040 A1 | | 1/2003 | McGregor et al. |
| 2003/0080061 A1 | | 5/2003 | Underdown et al. |
| 2003/0121661 A1 | | 7/2003 | Reddy et al. |
| 2004/0120847 A1 | * | 6/2004 | Dijkhuizen ....................... 422/7 |
| 2005/0080182 A1 | * | 4/2005 | Ahmed et al. ................. 524/458 |

FOREIGN PATENT DOCUMENTS

| | | |
|---|---|---|
| EP | 0933414 | 8/1999 |
| WO | 91/05832 | 5/1991 |

OTHER PUBLICATIONS

PCT Written Opinion issued in PCT Application No. PCT/US2007/060276 dated Jun. 4, 2007 (3 pages).
International Search Report issued in PCT/US2007/060276 mailed on Jun. 4, 2007 (2 pages).
European Office Action issued in Application No. 07710014.7, dated Apr. 28, 2009 (3 pages).
Office Action issued in Norwegian Application No. 20074031 dated Sep. 6, 2010 (2 pages).
Canadian Office Action for Canadian Application No. 2,600,856 mailed on Oct. 5, 2009 (2 pages).
Supplementary European Search Report issued in EP Application No. 07710014.7 dated Jan. 7, 2009 (5 pages).
European Office Action received in related Application No. 07710014.7-1217, dated Aug. 27, 2012 (4 pages).
Office Action (w/translation) issued in Norwegian Application No. 20074031 dated Oct. 21, 2013 (6 pages).

* cited by examiner

*Primary Examiner* — Zakiya W Bates
*Assistant Examiner* — Silvana Runyan
(74) *Attorney, Agent, or Firm* — Osha • Liang LLP

(57) ABSTRACT

A method for removing water from a wellbore fluid may include the steps of contacting a wellbore fluid with a water absorbing polymer, where the wellbore fluid includes an aqueous fluid, allowing the water absorbing polymer to interact with the wellbore fluid for a sufficient period of time so that the water absorbing polymer absorbs at least a portion of water in the aqueous fluid, and separating the water absorbing polymer containing the absorbed water from the wellbore fluid.

23 Claims, 4 Drawing Sheets

Range Finding Tests Using Water Absorbing Polymer

Water Absorption Characteristics

Water Absorption by 4 g/l Polymer in Water after 1 Minute Mixing

WATER ABSORBING POLYMERS FOR TREATMENT OF BRINES AND WATER-BASED DRILLING FLUIDS

CROSS-REFERENCE TO RELATED APPLICATIONS

This application claims priority, pursuant to 35 U.S.C. §119(e), to U.S. application Ser. No. 60/757,620 filed on Jan. 10, 2006, which is herein incorporated by reference in its entirety.

BACKGROUND OF INVENTION

1. Field of the Invention

The present disclosure relates generally to wellbore fluids. More specifically, the present disclosure relates to the recovery of drilling and completion fluids.

2. Background Art

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, fluid used for emplacing a packer, abandoning the well or preparing the well for abandonment, and otherwise treating the well or the formation.

Drilling fluids or muds typically include a base fluid (water, diesel or mineral oil, or a synthetic compound), weighting agents (most frequently barium sulfate or barite is used), bentonite clay to help remove cuttings from the well and to form a filter cake on the walls of the hole, lignosulfonates and lignites to keep the mud in a fluid state, and various additives that serve specific functions.

Historically, the drilling industry has used water-based muds (WBMs) because they are inexpensive. The used mud and cuttings from wells drilled with WBMs can be readily disposed of onsite at most onshore locations. WBMs and cuttings can also be discharged from platforms in many U.S. offshore waters, as long as they meet current effluent limitations guidelines, discharge standards, and other permit limits.

Brines (such as, for example, aqueous $CaBr_2$) are commonly used in WBMs because of their wide density range and the fact that brines are typically substantially free of suspended solids. Brines enhance the performance of WBMs by preventing the hydration and migration of swelling clay to reduce formation damage caused by solids or clay swelling or migration. A brine system may be selected to achieve a suitable density for use in a particular well-drilling operation. One advantage of using brines is that for a formation that is found to interact adversely with one type of brine, there is often another type of brine available with which that formation will not interact adversely. Typically, brines are selected from halide salts of mono- or divalent cations, such as sodium, potassium, calcium, and zinc. Chloride-based brines of this type have been used in the petroleum industry for over 50 years and bromide-based brines, for at least 25 years. Formate-based brines, however, have only been widely used in the industry relatively recently (roughly the past ten years).

Cesium formate, which is a particular formate that has been more recently used in drilling and completion fluids, may be used as a solids-free base fluid. Cesium formate is the heaviest of the clear alkali formate fluids, having a specific gravity of 2.3 (density of 19.2 pounds per gallon). Because of this intrinsic high density, the necessity of weighting agents, such as barium sulfate, which can damage tools and the formation, can be eliminated. Other alkali formates, which are of lower density than cesium formate, and that are typically used in drilling and completion fluids include potassium formate and sodium formate. Lower density formates are often be blended with cesium formate to produce a fluid having a specific gravity between 1.0 and 2.3.

Fluids containing cesium formate have been shown to increase production and improve drilling speeds, which can save time and reduce operating costs. Cesium formate has also been shown to be compatible with all major elements of the drilling (BOP, surface equipment, MWD, LWD and mud motors) and completion equipment (metals and elastomers), under conditions of high temperature and pressure. The monovalent nature of cesium formate reduces the likelihood of reservoir formation damage, providing operators with good control and desirable lubricity downhole. Furthermore, alkali formates do not damage the producing formation or downhole metals as their corrosive alternatives (high-density brines) may do. Because it is biodegradable as well as non-corrosive, cesium formate is considered an environmentally safer product than other drilling fluids on the market.

However, despite the desirable performance that results from a well drilled with cesium formate, there are effective limitations on its use. A fluid that includes cesium formate is relatively expensive, so the economics of drilling require that any available cesium formate be reclaimed and recycled. There are, however, limitations on reclamation processes, in terms of both maximum percentages of cesium formate reclaimed and economical feasibility.

Reclamation processes typical of drilling and completion fluids include removal of dissolved contaminants and any solid cuttings or debris or changes to pH or the coloration of the brine. However, complicating the economic feasibility of reclamation of cesium formate brines, drilling and/or completion operations often result in an influx of water into the cesium formate mud or brine and thus a dilution of the water based mud or brine from its desired cesium formate concentration. Thus, because of the additional volume of water present in a recycled drilling fluid, additional amounts of cesium formate must be added to the fluid to return it to the desired cesium formate concentration level in order to maintain the mud's desired properties. While effective, this approach requires the expense of adding additional cesium formate to each reclaimed barrel of fluid and effectively increases the total volume of reclaimed fluid as compared to the volume of fluid initially used in the well.

Alternative processes of reclaiming a fluid to a desired cesium formate levels include attempts to remove the additional volume of water from the fluid. One of these approaches is to heat off/evaporate the excess water from the reclaimed fluid, which may be performed in large cooling towers or in a high shear mixer. While effective, the heating and evaporation of excess water from the reclaimed fluids require a relatively high amount of energy to bring the brines to their desired salt concentration levels. Another approach uses reverse osmosis to separate excess water from the brine. Because reverse osmosis is naturally a slow and labor intensive process, especially as the brine nears saturation levels, reverse osmosis has also been coupled with a high frequency vibration system to decrease the total cycle time for filtration process. While, more effective than simple reverse osmosis, economical limitations still exist.

Accordingly, there exists a need for means to economically reclaim a wellbore fluid to reduce the amount of contaminant water present in the fluid without altering the fluid's desired properties.

SUMMARY OF INVENTION

In one aspect, the present disclosure relates to a method for removing water from a wellbore fluid. The method may include the steps of contacting a wellbore fluid with a water absorbing polymer, where the wellbore fluid includes an aqueous fluid, allowing the water absorbing polymer to interact with the wellbore fluid for a sufficient period of time so that the water absorbing polymer absorbs at least a portion of water in the aqueous fluid, and separating the water absorbing polymer containing the absorbed water from the wellbore fluid.

In another aspect, the present disclosure relates to a method for recycling a wellbore fluid. The method may include the steps of collecting a wellbore fluid from a well, where the wellbore fluid includes an aqueous fluid, contacting the wellborn fluid with a water absorbing polymer, allowing the water absorbing polymer to interact with the wellbore fluid for a sufficient period of time so that the water absorbing polymer absorbs at least a portion of water in the wellbore fluid, and separating the water absorbing polymer containing absorbed water from the wellborn fluid.

In yet another aspect, the present disclosure relates to a method of removing water from a wellbore fluid. The method may include the steps of pouring the wellbore fluid over a filter, where the wellbore fluid includes an aqueous fluid, and where the filter includes a water absorbing polymer and allowing the wellborn fluid and the water absorbing polymer sufficient time to interact so that the water absorbing polymer absorbs at least a portion of water in the aqueous fluid.

Other aspects and advantages of the invention will be apparent from the following description and the appended claims.

DETAILED DESCRIPTION

Figure 1:
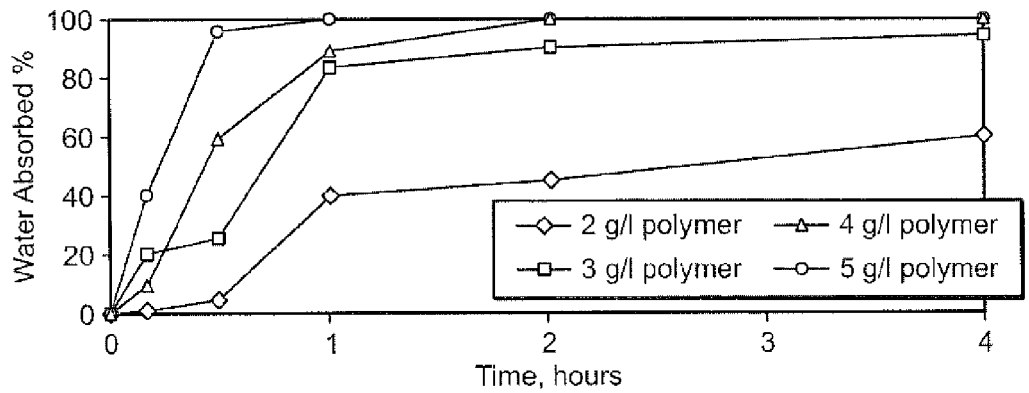
FIG. 1 shows a graphical representation of water absorbed for various polymers.

In one aspect, embodiments of the disclosure are generally directed to a reclamation process for wellbore fluids that have taken on excess water during their use. As described above, during the use of a wellbore fluid, water often contaminates the wellborn fluid so as to increase the total volume of the wellbore fluid and alter the concentration of salts or other wellbore additives from their initial, desired concentration. According to embodiments of the present disclosure, excess water may be removed from a wellbore fluid by contacting the wellbore fluid with a water absorbing polymer.

In one embodiment, the water absorbing polymer may include crosslinked polyacrylamide, polyacrylate, or copolymers thereof. Particularly, the water absorbing polymer may include a copolymer of polyacrylamide, that may be crosslinked via internally amide groups or an additional crosslinking agent, two strands of sodium polyacrylate crosslinked with bis(acrylamide). In other embodiments, the water absorbing polymer may include carboxylate containing polymers such as polyacrylates, polyaspartates, and polylacetates, sulfonate containing polymers, quaternary or cationic amine containing polymers such as polyallylamine or polyethyleneimine, and polyacrylamide, polyvinyl alcohol gels, and polyurethane gels. Water absorbing polymers and the process for making such polymers suitable for embodiments of the present disclosure, include those described in U.S. Pat. Nos. 4,618,631, 4,698,404, 4,755,560, 6,222,091, 6,376,072, and 6,750,262, which are herein incorporated by reference in their entirety. Some of these various water absorbing polymers have had specific application in the disposable diaper and agricultural water retention industries because of their ability absorb up to 400 times their weight in water.

The absorbance capacity of the water absorbing polymers may be explained by the matrix-like structure of thy water absorbing polymer particle. The dry polymer may contain charged species within the matrix, such that the ionization of the polymer will cause the matrix network to open and create cavities that may absorb water by capillary action. Water absorbed into the polymer may be retained by hydrogen bonds that form between the charged species and the water. The actual mechanism for water absorbance and retention may vary based on the structure of a particular water absorbing polymer. For example, sodium polyacrylate, in the dry powdered state, contains a coiled backbone, lined with carboxyl groups. When exposed to an aqueous solution, the carboxyl groups dissociate into negatively charged carboxylate ions, which may repel one another along the polymer chain. The repelling carboxylate ions thereby widen the polymer coils and allow water to move into contact with inner carboxyl groups, further continuing the widening or swelling of the polymer. Water is retained within the polymer due to hydrogen bonding between the water and the carboxylate ions on the polymer. Polyacrylamide, another water absorbing polymer, is structurally similar to polyacrylate but substitutes amide groups for the carboxyl groups on the polymer backbone. Free, unlinked amide groups, because they contain —$NH_2$ groups, can form hydrogen bonds with water. Further, because of the crosslinking that exists in these water absorbing polymers, the water absorbing polymers remain insoluble in an aqueous solution.

The water absorbing polymer is used in accordance with embodiments of the present disclosure by contacting the water absorbing polymer with a wellbore fluid having an aqueous fluid and water in excess of a desired amount. The aqueous fluid of the wellbore fluid may include at least one of fresh water, sea water, brine, mixtures of water and water-soluble organic compounds and mixtures thereof.

As used herein, brine refers to various salts and salt mixtures dissolved in an aqueous solution. A brine of the present disclosure may include halide or carboxylate salts of mono- or divalent cations of alkali metals, such as cesium, potassium, calcium, and/or sodium salts of bromide, chloride, and formate. Preferably, a brine of the present disclosure includes cesium formate dissolved in an aqueous solution.

Additionally, wellbore fluids of the present disclosure may include various additives, including viscosifiers, fluid loss control agents, corrosion inhibitors, weighting agents (such as barium sulfate).

When a wellbore fluid is initially formulated for use in a well, a particular amount of salt and/or additives is added to an aqueous fluid so that the wellbore fluid has an initial concentration of salt and/or additive necessary for the particular well application. Upon collecting the fluid from the well after its use, the wellbore fluid may have a concentration of salt and/or additive less than the initial concentration because of a volume of water that may have been taken on during the fluid's use.

Wellbore fluids that may be used with a water absorbing polymer in accordance with the present disclosure may include any fluids having excess water that have been collected from a wellbore, such as drilling fluids, completion fluids, workover fluids, and drill-in fluids. When the water absorbing polymer is introduced to such a wellbore fluid, the polymer can interact with the excess water to absorb and retain a volume of water. Upon a sufficient amount of exposure time, the water absorbing polymers having a quantity of water retained within may be separated from the wellbore fluid so as to completely remove the absorbed water from the wellbore fluid.

The reaction or exposure time necessary to bring a wellbore fluid to its desired salt and/or additive concentration may vary according to several factors, including but not limited to the composition of the fluid, salt type and concentration, particle size distribution of the polymer particles, contaminants in a mud, such as solids and polymers. These factors may similarly affect the performance of a water absorbing polymer in the amount of water that may absorbed by the polymer. For example, particle size distribution of the polymer particles may effect reaction time and/or performance in that smaller particles effectively allow for enlarged surface area of the polymer and thus tend to absorb water more quickly as compared to larger particles. One of ordinary skill in the art would recognize that some quantity of salt may also be absorbed by the polymer, and thus, prior to re-use of the wellbore fluid, it may be necessary to adjust the salt concentration appropriately.

In one embodiment, the water absorbing polymer may take the form of individual polymer granules that may swell upon the absorbance of water into a larger, swollen polymer globules. Individual granules of polymer may be poured directly into a volume of wellbore fluid. After a sufficient time, the polymer and absorbed volume of excess water may be removed from the wellbore fluid by any mechanical means as known in the art, including, for example, shale shakers, bag filters, filter presses.

Alternatively, the water absorbing polymer may be incorporated with a pad or screen so as to create a filter of water absorbing polymer. Within the filter, the polymer may have a granular or fibrous structure. When the water absorbing polymer is used within a filter, a wellbore fluid may be poured over the water absorbing polymer-containing filter. As the wellbore fluid passes through the filter, excess water in the wellbore fluid may be absorbed by the polymer. In one embodiment, the wellbore fluid is passed through a single filter. In another embodiment, the wellbore fluid is passed through a plurality of filters. A plurality of filters containing the water absorbing polymer may be arranged in a stack, so that the wellbore fluid passes through each filter. This may effectively increase the surface area of the filter, and thus, the amount of water that may be removed from the wellbore fluid. In some embodiments, the plurality of filters may be incorporated into an apparatus resembling a filter press. While a filter press is generally used to remove solids from a fluid, by incorporating the water absorbing polymer into filter pads, excess water may be removed from a wellbore fluid.

If a batch of wellbore fluid to be treated with the water absorbing polymer also contains solids particles suspended therein, the solids particles may be removed in conjunction with the removal of the excess water. For example, when individual granules of water absorbing polymer are poured into a volume of wellbore fluid, any solid particles suspended therein may be removed in the polymer separation process or may be removed in a previous or subsequent separation process. Alternatively, when the water absorbing polymer is contained within a filter, a single filter pad may be designed to remove both excess water and solid particles within the wellbore fluid or a filter pad designed to remove only solid particles may be used in conjunction with a filter containing the water absorbing polymer.

After the water absorbing polymer swollen with water has been separated from the wellbore fluid, the water may be optionally released from the polymer. Release of the retained water may vary depending on the water absorbing polymer used, as known by one of ordinary skill in the art. These processes may include, for example, subjecting the swollen polymer to increased shear or rinsing the swollen polymers in a solution that will drive water out of the polymer, etc, so that the hydrogen bonds may break and the retained water may be released from the polymer.

EXAMPLES

The following examples use a polyacrylamide co-polymer (94%), commercially available under the trade name CIBA® ALCOSORB® AB3 (Ciba Specialty Chemicals, Tarrytown, N.Y.), added to de-ionized water. Tested concentrations of the polyacrylamide range from 2 g/L to 10 g/L.

Polymer Concentration and Water Absorbency

Concentrations of 2, 3, 4, and 5 g/L of the polymer were mixed in beakers. Each mixture was stirred by hand for 1 minute and left to age. At set time intervals, the free liquid was decanted into a sand sieve (75 microns) and left to drain for 2 minutes. The recanted water volume was measured and then decanted back into the beaker containing the polymer to allow for measuring of additional water absorbance at subsequent time interval. The time intervals tested were 10 minutes, 30 minutes, 1 hour, 2 hours, and 4 hours. The percentage of water absorbed at each interval for each concentration is shown in FIG. 1. From FIG. 1, it can be shown that concentrations of 4 to 5 g/L near complete absorbance of the water mixed with the polymer.

Figure 2:
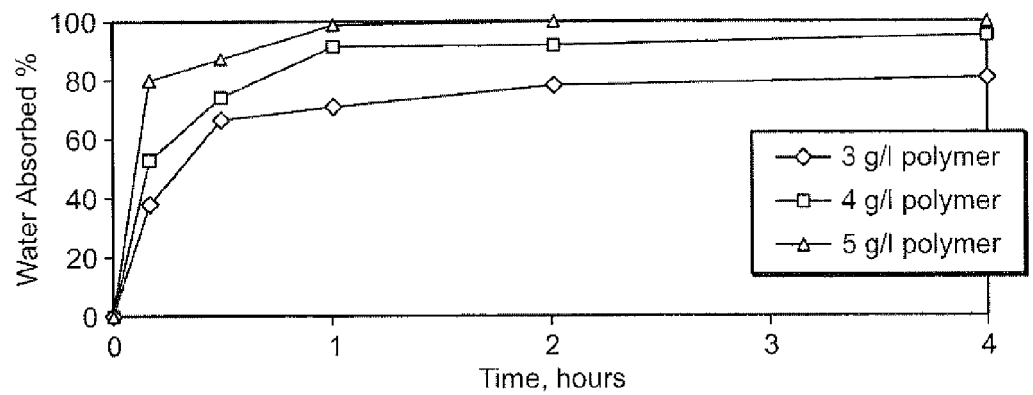
FIG. 2 shows a graphical representation of water absorbed for various polymers.

Based on the results in FIG. 1, water absorbance measurements for polymer concentrations of 3, 4, and 5 g/L were repeated with individual tests at each time interval to eliminate any error due to decanting. The results are shown in FIG. 2. From FIG. 2, it can be shown that for the 5 g/L concentration of polymer in water, the polymer absorbs approximately 100 percent of the water within 1 hour. For a concentration of 4 g/L, the polymer was able to absorb close to 100 percent of the water after 4 hours. Thus, the polymer was able to absorb approximately 200 times its own weight in water. Variation between the results shown in FIGS. 1 and 2 may be a result of experimental error or other factors, such as temperature.

Effect of Mixing Energy on Water Absorbency

Figure 3:
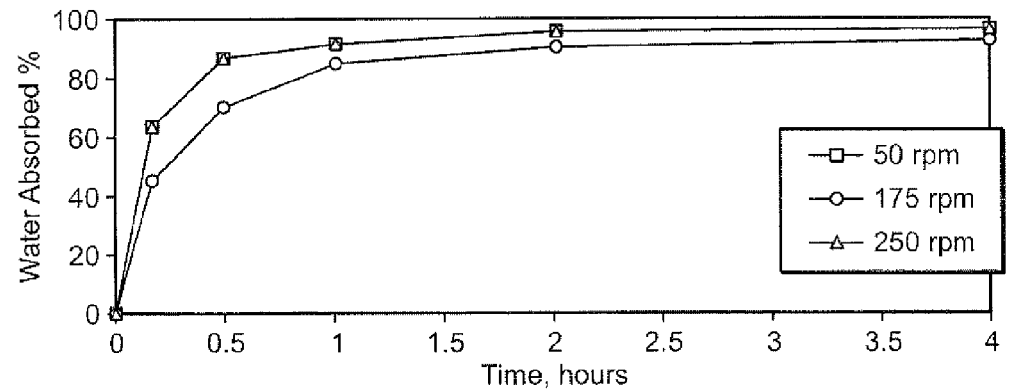
FIG. 3 shows a graphical representation of water absorbed by a polymer at various mixing speeds.

In this test, the polymer's reaction to shear was investigated. Samples of 0.4 grams of polymer added to 100 milliliters of water were mixed using a Bibby Sterlin jar mixer for 1 minute as speeds of 50, 175, and 200 rpm. The amount of water absorbed was measured, the results of which are shown in FIG. 3. From FIG. 3, it can be shown that by increasing the speed from 50 to 175 rpm, a significant increase in reaction rate can be obtained.

Effect of Mixing Time on Water Absorbency

Figure 4:
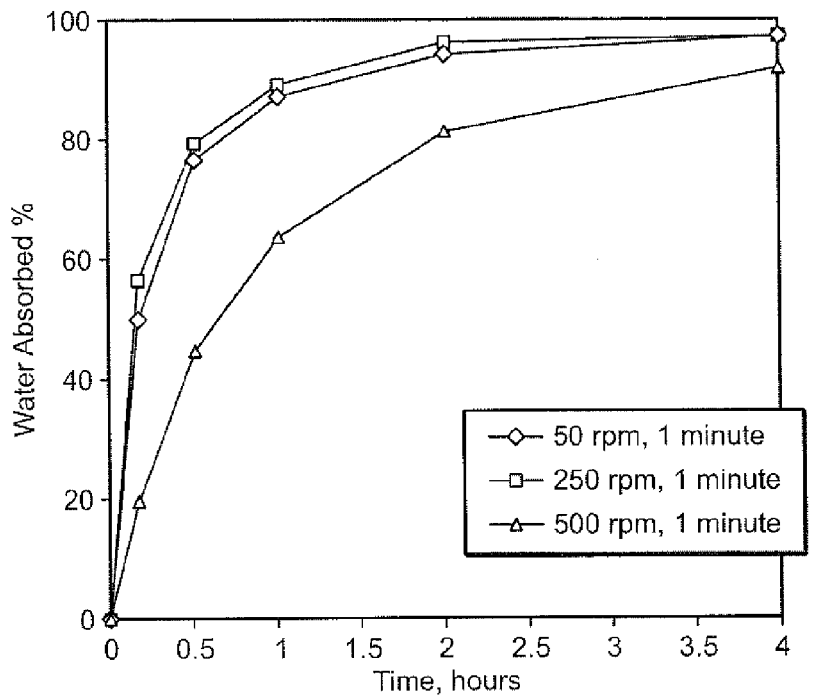
FIG. 4. shows a graphical representation of water absorbed by a polymer at various mixing speeds.

Volumes of 100 milliliters of 4 g/L of polymer in water were prepared and mixed in a Bibby jar mixer at speeds of 50, 250, and 500 rpm, with mixing times of 1 and 5 minutes. The amount of water absorbed was measured, and results are shown for mixing tunes of 1 and 5 minutes in FIGS. 4 and 5, respectively. From FIGS. 4 and 5, it appears the shorter mixing time shows greater capacity for the polymer to absorb water.

Polymer Recovery

Samples of swollen polymers were mixed at medium and high speeds with a Heidolph mixer to determine the stability of the swollen polymer. Mixing of the hydrated polymer with a Heidolph mixer at a medium speed resulted in no significant change to the polymer, i.e., there was no observed release of absorbed water and discrete swollen polymer globules remained. Increasing the mixer speed, however, resulted in the sample having a wetter consistency after 4 minutes, due to slight water release by the polymer globules.

In order to simulate a shaker separation of the swollen polymer from any unreacted wellbore fluid, samples of swollen polymers formed from 3, 4, and 5 g/L concentrations were subjected to a Fritsch lab shaker, with 1 and 2 millimeter sieves. The shaker was switched on for 2 minutes at a medium setting, and the collection of polymer on each sieve was determined. The 4 and 5 g/L samples contained no free water, and when the polymers were sieved, all of the polymer was retained on the 2 mm sieve. Sieve action on the 3 g/L sample resulted in slight disintegration of the polymer particles and release of some water. Traces of water and a paste-like polymer appeared on the 1 mm screen and the base collecting pan plate. These results may be explained by a greater amount of water absorbed per unit weight of the 3 g/L sample, as compared to the 4 and 5 g/L samples. Thus, the water in the 3 g/L sample may not be as tightly entrained into the polymer matrix and therefore more susceptible to shear and release of water.

Selective Water Absorbance from Brine Solutions

Figure 5:
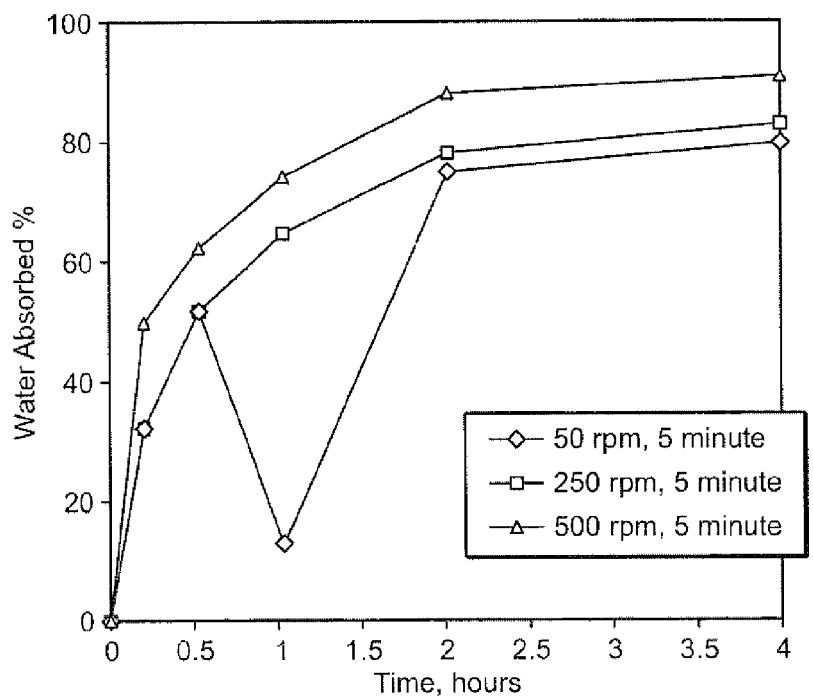
FIG. 5 shows a graphical representation of water absorbed by a polymer at various mixing speeds.
Figure 6:
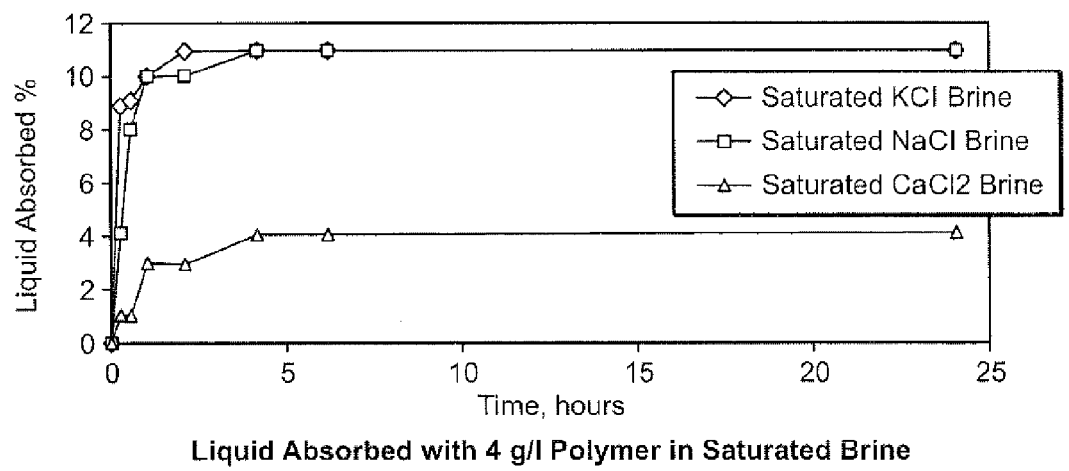
FIG. 6 shows a graphical representation of water absorbed by a polymer in brine.

Saturated solutions of potassium chloride, calcium chloride, and sodium chloride were prepared, and polymer was added to each to obtain 4 g/L of polymer in each brine solution. The solutions were mixed for 1 minute at 250 rpm using a jar mixer. The water absorbency was determined over a 24 hour period, by measuring the quantity of free solution. Tests were repeated using 10 g/L of polymer over a 4 hour period. Chloride measurements of the unabsorbed fluid were made by titration to determine if the liquid absorbed by the polymer was brine or water. FIG. 5 shows the amount of liquid absorbed by 4 g/L polymer in saturated KCl, NaCl, and $CaCl_2$ brines. A maximum of 11% liquid was absorbed in the monovalent (KCl and NaCl) brine solutions and only 4% liquid was absorbed in the divalent ($CaCl_2$) brine, over a 24 hour period. The polymer remained granular in the presence of saturated $CaCl_2$ and was not seen to obtain the swollen jelly-like consistency observed with higher water absorption. As shown in FIG. 6, increasing the polymer concentration to 10 g/L increased the volume of liquid absorbed to 26-28% for the monovalent brines and to 7% for the divalent brine. The presence of salt decreased the liquid absorption and increased the reaction time period. Additionally, the presence of divalent ions may react with the negative charges of the polymer and cause a stabilization of the matrix, thus preventing the polymer from creating cavities for further water absorption by capillary action.

Figure 7:
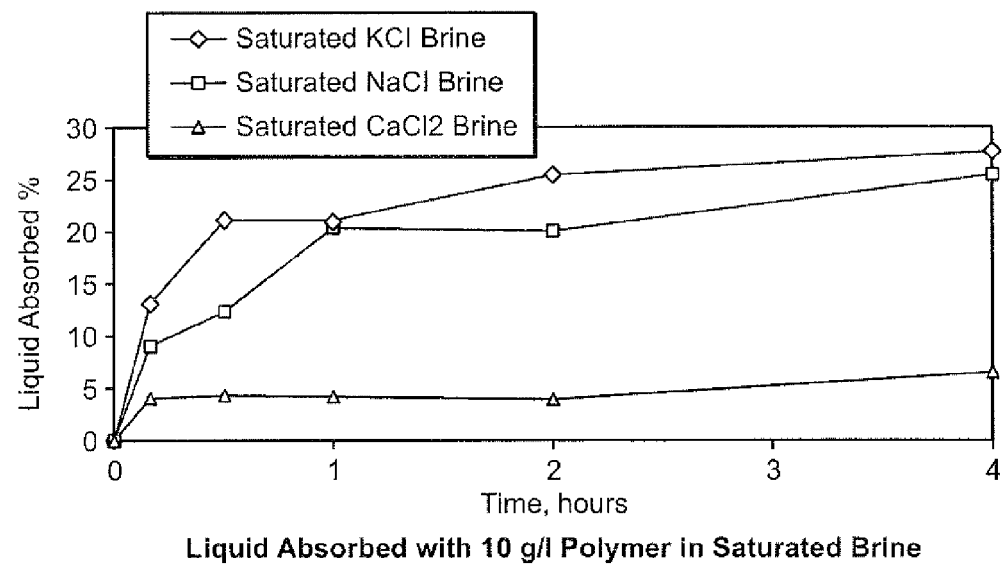
FIG. 7 shows a graphical representation of water absorbed by a polymer in brine.
Figure 8:
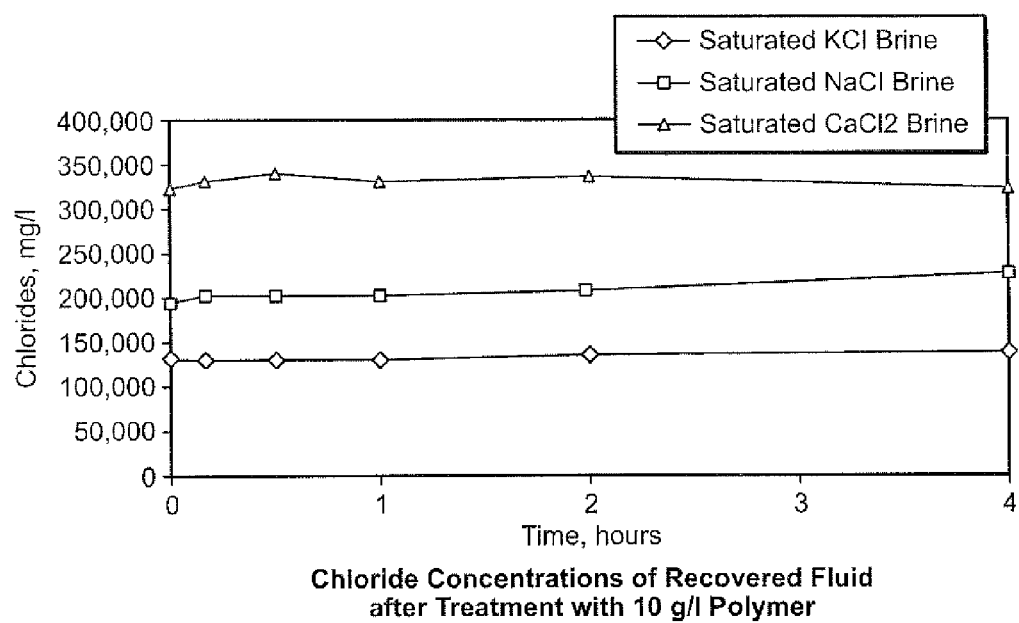
FIG. 8 shows a graphical representation of chloride concentrations of a fluid after treatment with a polymer.

FIG. 7 shows the chloride concentrations measured in the un-absorbed liquid after treatment with 10 g/L polymer. From FIG. 7, it can be shown that the chloride concentrations remain constant throughout each test. Thus, the liquid absorbed by the polymer was whole brine. However, for absorbance of only water to occur, salt precipitation would have to occur.

A long-term effect was tested, treating 250 milliliters of brine with polymer (10 g/L) and mixing the solution at 250 rpm for 1 minute by a jar mixer. The polymer was allowed to react with the brine for 146 hours before water absorption was measured. Increasing the reaction time to 146 hours showed no additional brine absorption over that observed in the 4 hour period.

While reference has been made to particular salts used in a wellbore fluid, it is expressly within the scope of the present disclosure that other mixtures of salts and other wellborn fluid additives may be used individually or in conjunction with the any above described salts. Further, it is expressly within the scope of the present disclosure that combinations of formate salts may be used.

Additionally, the water absorbing polymer may be used in the recycling of a wellbore fluid comprised of an aqueous fluid. Upon collecting a wellbore fluid from a well, the fluid may be contacted with the water absorbing polymer and allowed to interact for a sufficient period of time so that the water absorbing polymer absorbs at least a portion of water in the aqueous fluid. Upon separation of the water absorbing polymer from the wellbore fluid, the wellbore fluid may be reused in a drilling operation. Furthermore, in some embodiments, the wellbore fluid may be subject to other treatment processes as known in the art, such as filtering of solid contaminants, change in pH, removal of other dissolved contaminants, etc, that may be required in order for the fluid to be reused in a well.

Further, while reference has been made to particular forms of the water absorbing polymer that may be used with a wellbore fluid, it is expressly within the scope of the present disclosure that that the water absorbing polymer may take any structure or form in contacting and removing any excess water from an aqueous wellbore fluid.

Advantageously, embodiments of the present disclosure may provide for means to economically recycle a wellbore fluid that has taken on excess water during its use. Water may be selectively absorbed, allowing a more saturated solution of a wellbore fluid to be obtained. Additionally, water may be easily separated from a wellbore fluid, with minimal energy and economical constraints. Such process may be optionally performed at the wellsite for a relatively immediate reuse.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for removing excess water from a dilute wellbore fluid containing drilling solids, comprising:
    contacting a dilute wellbore fluid with a water absorbing polymer, the dilute wellbore fluid comprising:
    an aqueous fluid comprising halide or carboxylate salts of mono- or divalent cations;

allowing the water absorbing polymer to interact with the dilute wellbore fluid for a sufficient period of time so that the water absorbing polymer absorbs only a portion of water in the dilute wellbore fluid forming a concentrated wellbore fluid comprising the halide or carboxylate salts of mono- or divalent cations; and separating the drilling solids in conjunction with the water absorbing polymer containing the absorbed water from the concentrated wellbore fluid by a filter.

2. The method of claim 1, wherein the aqueous fluid is selected from at least one of fresh water, sea water, brine, mixtures of water and water soluble organic compounds and mixtures thereof.

3. The method of claim 2, wherein the aqueous fluid comprises an alkali salt of a formate, bromide, chloride, or mixtures thereof.

4. The method of claim 3, wherein the aqueous fluid comprises cesium formate.

5. The method of claim 1, wherein the water absorbing polymer comprises crosslinked polyacrylamide, polyacrylate, or copolymers thereof.

6. The method of claim 1, wherein the dilute wellbore fluid further comprises:

at least one additive selected from viscosifiers, fluid loss control agents, corrosion inhibitors, weighting agents, and combinations thereof.

7. The method of claim 1, further comprising:

removing at least a portion of the absorbed water from the water absorbing polymer.

8. The method of claim 1, wherein contacting the dilute wellbore fluid with the water absorbing polymer comprises pouring water absorbing polymer beads into a volume of the dilute wellbore fluid.

9. The method of claim 1, wherein contacting the dilute wellbore fluid with the water absorbing polymer occurs simultaneously with the separating and comprises pouring the wellbore fluid over the filter, wherein the filter comprising the water absorbing polymer.

10. The method of claim 1, further comprising utilizing the concentrated wellbore fluid in drilling operations.

11. A method for recycling a dilute wellbore fluid, comprising:

contacting a dilute wellbore fluid with a water absorbing polymer, the dilute wellbore fluid comprising:

an aqueous fluid comprising halide or carboxylate salts of mono- or divalent cations;

allowing the water absorbing polymer to interact with the dilute wellbore fluid for a sufficient period of time so that the water absorbing polymer absorbs only a portion of water in the dilute wellbore fluid forming a concentrated wellbore fluid comprising the halide or carboxylate salts of mono- or divalent cations; and separating the water absorbing polymer containing absorbed water from the concentrated wellbore fluid by a filter.

12. The method of claim 11, wherein the aqueous fluid is selected from at least one of fresh water, sea water, brine, mixtures of water and water soluble organic compounds and mixtures thereof.

13. The method of claim 12, wherein the aqueous fluid comprises an alkali salt of a formate, bromide, chloride, or mixtures thereof.

14. The method of claim 13, wherein the aqueous fluid comprises cesium formate.

15. The method of claim 11, wherein the water absorbing polymer comprises crosslinked polyacrylamide, polyacrylate, or copolymers thereof.

16. The method of claim 11, wherein contacting the dilute wellbore fluid with the water absorbing polymer comprises pouring water absorbing polymer beads into a volume of the dilute wellbore fluid.

17. The method of claim 11, further comprising utilizing the concentrated wellbore fluid in drilling operations.

18. The method of claim 11, wherein contacting the dilute wellbore fluid with the water absorbing polymer occurs simultaneously with the separating and comprises pouring the wellbore fluid over the filter, wherein the filter comprising the water absorbing polymer.

19. A method of removing water from a dilute wellbore fluid, comprising:

filtering the dilute wellbore fluid through a filter pad comprising a water absorbing polymer within the filter pad, wherein the dilute wellbore fluid comprises an aqueous fluid;

wherein during the filtering, the dilute wellbore fluid and the water absorbing polymer within the filter pad interact so that the water absorbing polymer absorbs a portion of water in the dilute wellbore fluid as the remaining portion of the aqueous fluid passes through the filter pad forming a concentrated wellbore fluid.

20. The method of claim 19, wherein the dilute wellbore fluid further comprises solid particles suspended therein.

21. The method of claim 20, further comprising:

removing the solid particles from dilute wellbore fluid.

22. The method of claim 19, wherein the water absorbing polymer comprises crosslinked polyacrylamide, polyacrylate, or copolymers thereof.

23. The method of claim 19, further comprising utilizing the concentrated wellbore fluid in drilling operations.

* * * * *